United States Patent
Koike

(10) Patent No.: US 8,873,142 B2
(45) Date of Patent: Oct. 28, 2014

(54) DISPLAY PANEL, DISPLAY DEVICE, AND ELECTRONIC APPARATUS CAPABLE OF IMPROVED STEREOSCOPIC DISPLAY

(75) Inventor: Ai Koike, Tottori (JP)

(73) Assignee: Japan Display West Inc., Aichi (JP)

( * ) Notice: Subject to any disclaimer, the term of this patent is extended or adjusted under 35 U.S.C. 154(b) by 131 days.

(21) Appl. No.: 13/414,809

(22) Filed: Mar. 8, 2012

(65) Prior Publication Data

US 2012/0243084 A1 Sep. 27, 2012

(30) Foreign Application Priority Data

Mar. 25, 2011 (JP) ................................ 2011-068154

(51) Int. Cl.
- *G02B 27/22* (2006.01)
- *G02B 27/26* (2006.01)
- *G02F 1/1335* (2006.01)
- *H04N 13/04* (2006.01)
- *G02F 1/1333* (2006.01)

(52) U.S. Cl.
CPC .......... *G02B 27/2214* (2013.01); *G02B 27/225* (2013.01); *G02B 27/26* (2013.01); *H04N 13/0409* (2013.01); *G02F 2001/133388* (2013.01); *G02F 1/133512* (2013.01)
USPC ............................... 359/462; 349/15; 348/51

(58) Field of Classification Search
CPC .. G02B 27/22; G02B 27/2214; G02B 27/225; G02F 1/133512; H04N 13/0409; H04N 13/0415
USPC .................... 349/15; 359/462, 888, 892, 464; 348/51, 42
See application file for complete search history.

(56) References Cited

U.S. PATENT DOCUMENTS

| | | | | |
|---|---|---|---|---|
| 6,055,103 | A * | 4/2000 | Woodgate et al. | 359/489.07 |
| 7,245,333 | B2 * | 7/2007 | Nam et al. | 349/58 |
| 7,576,708 | B2 * | 8/2009 | Tanaka | 345/7 |
| 7,649,688 | B2 * | 1/2010 | Racette et al. | 359/464 |
| 7,782,409 | B2 * | 8/2010 | Kean et al. | 349/15 |
| 2009/0185088 | A1 * | 7/2009 | Shinohara | 349/12 |
| 2010/0053749 | A1 * | 3/2010 | Yun et al. | 359/464 |
| 2010/0283924 | A1 * | 11/2010 | Lee et al. | 349/15 |
| 2010/0321621 | A1 * | 12/2010 | Kikuchi et al. | 349/122 |
| 2011/0157257 | A1 * | 6/2011 | Bennett et al. | 345/690 |
| 2011/0199549 | A1 * | 8/2011 | Washizawa | 349/15 |
| 2012/0262637 | A1 * | 10/2012 | Ikeda et al. | 349/15 |

FOREIGN PATENT DOCUMENTS

| | | |
|---|---|---|
| JP | 08-106070 | 4/1996 |
| JP | 09-281440 | 10/1997 |

* cited by examiner

*Primary Examiner* — Thomas K Pham
*Assistant Examiner* — Nicholas Pasko
(74) *Attorney, Agent, or Firm* — Dentons US LLP

(57) ABSTRACT

A display panel includes a panel section having a display area in which a plurality of display pixels are two-dimensionally disposed and a ring-like frame area provided at the periphery of the display area, and a barrier section that is disposed at a position opposed to the panel section and has a barrier pattern composed of a light blocking area and a light transmissive area. Both the light blocking area and the light transmissive area are disposed in a first area opposed to the display area and a ring-like second area opposed to the frame area.

18 Claims, 12 Drawing Sheets

DISPLAY PANEL, DISPLAY DEVICE, AND ELECTRONIC APPARATUS CAPABLE OF IMPROVED STEREOSCOPIC DISPLAY

RELATED APPLICATION DATA

The present application claims priority to Japanese Priority Patent Application JP 2011-068154 filed in the Japan Patent Office on Mar. 25, 2011, which is hereby incorporated by reference in its entirety to the extent permitted by law.

BACKGROUND

The present disclosure relates to a display panel capable of multi-view displaying that allows visual recognition of two-dimensional video (planar video) that differs for each point of view or three-dimensional displaying that allows visual recognition of three-dimensional video (stereoscopic video) from a specific point of view. Furthermore, the present disclosure relates to a display device including this display panel and electronic apparatus including this display device.

In recent years, display devices capable of multi-view displaying or three-dimensional displaying have been put into practical use. As one of such display devices, e.g. a display device having a barrier layer over the display area of a display panel is known. As one of such barrier layers, a barrier layer in which plural light transmissive slits isolated from each other by a light blocking area are provided is disclosed in Japanese Patent Laid-open No. Hei 9-281440 for example. Furthermore, a barrier liquid crystal in which a light blocking area is generated by voltage application to a liquid crystal is disclosed in Japanese Patent Laid-open No. Hei 8-106070 for example.

SUMMARY

If the above-described barrier layer is provided, light leakage readily occurs from the periphery of the barrier layer. As a countermeasure against this problem, covering the periphery of the barrier layer by the metal frame of the chassis will be possible for example. To obtain this structure, the edge of the display area, in which plural display pixels are two-dimensionally disposed, needs to be precisely aligned with the edge of the metal frame. However, for this precise alignment, positioning of the metal frame needs to be performed at the pixel-size level. Therefore, slight dimensional error or position misalignment of the metal frame leads to a possibility that the metal frame covers the display pixel.

In addition, a method of enlarging the outer periphery of the barrier layer to the area where light leakage occurs to prevent the light leakage will be possible for example. Normally, the metal frame has a size somewhat larger than the display area in view of dimensional error and position misalignment. Therefore, if the outer periphery of the barrier layer is enlarged as described above, the light blocking area of the barrier layer is located between the metal frame and the display area and thus the light blocking area often looks like a black streak. In particular, if the metal frame is decorated with a bright color such as white, this black streak is conspicuous and is possibly regarded as displaying failure.

The present disclosure has been made in order to solve the problems described above, and it is therefore desirable to provide a display panel capable of making the black streak inconspicuous, and display device and electronic apparatus including it.

According to an embodiment of the present disclosure, there is provided a display panel including a panel section and a barrier section disposed at a position opposed to the panel section. The panel section has a display area in which a plurality of display pixels are two-dimensionally disposed and a ring-like frame area provided at the periphery of the display area. The barrier section has a barrier pattern composed of a light blocking area and a light transmissive area. Both the light blocking area and the light transmissive area are disposed in a first area opposed to the display area and a ring-like second area opposed to the frame area.

According to another embodiment of the present disclosure, there is provided a display device including the above-described display panel and a drive section that drives at least the panel section out of the panel section and the barrier section. According to another embodiment of the present disclosure, there is provided electronic apparatus including the above-described display device.

In the display panel, the display device, and the electronic apparatus according to the embodiments of the present disclosure, both the light blocking area and the light transmissive area of the barrier section are disposed in not only the first area opposed to the display area but also the ring-like second area opposed to the frame area. Due to this feature, in not only the display area but also the frame area, the light blocking area included in the barrier pattern is disposed and the light transmissive area included in the barrier pattern is disposed. As a result, light that is unnecessary for displaying is blocked by the light blocking area included in the barrier pattern in not only the display area but also the frame area. Furthermore, light transmitted through the light transmissive area included in the barrier pattern is output from not only the display area but also the frame area.

In the display panel, the display device, and the electronic apparatus according to the embodiments of the present disclosure, the light transmissive area is formed of e.g. a plurality of light transmissive slits. In this case, the plurality of light transmissive slits are disposed regularly as a whole, and the respective light transmissive slits have the same shape and the same size for example.

The light transmissive area is disposed at places corresponding to the left and right sides of the display area in the second area for example. Furthermore, according to need, the light transmissive area may be disposed also at places corresponding to the upper and lower sides of the display area in the second area. Part of the plurality of light transmissive slits may be disposed in only the second area in such a manner as not to range over the first area. Furthermore, all or part of the plurality of light transmissive slits may be so disposed as to straddle both the first area and the second area.

The display area has e.g. a rectangular shape having four sides. In this case, the light blocking area may be formed of a plurality of light blocking slits extended along a direction parallel to one side of the display area or may be formed of a plurality of light blocking slits extended along a direction intersecting one side of the display area. Alternatively, the light blocking area may be formed of a plurality of light blocking slits that are arranged along a first direction intersecting one side of the display area and are arranged also along a second direction intersecting the first direction.

The barrier section may have a light blocking component in the light blocking area and have an aperture in the light transmissive area. Furthermore, the barrier section may be capable of controlling an optical characteristic of the light blocking area based on a control signal from the external.

In the display panel, the display device, and the electronic apparatus according to the embodiments of the present disclosure, light that is unnecessary for displaying is blocked by the light blocking area included in the barrier pattern in not only the display area but also the frame area. Furthermore, light transmitted through the light transmissive area included in the barrier pattern is output from not only the display area but also the frame area. Therefore, the black streak can be made inconspicuous with prevention of light leakage that leads to displaying failure.

If the light transmissive area is disposed at not only the places corresponding to the left and right sides of the display area but also the places corresponding to the upper and lower sides of the display area in the second area in the embodiments of the present disclosure, the black streak can be made inconspicuous with prevention of light leakage that leads to displaying failure also when the display panel is so used as to be rotated by 90 degrees for example.

DETAILED DESCRIPTION OF THE PREFERRED EMBODIMENT

Figure 1A:
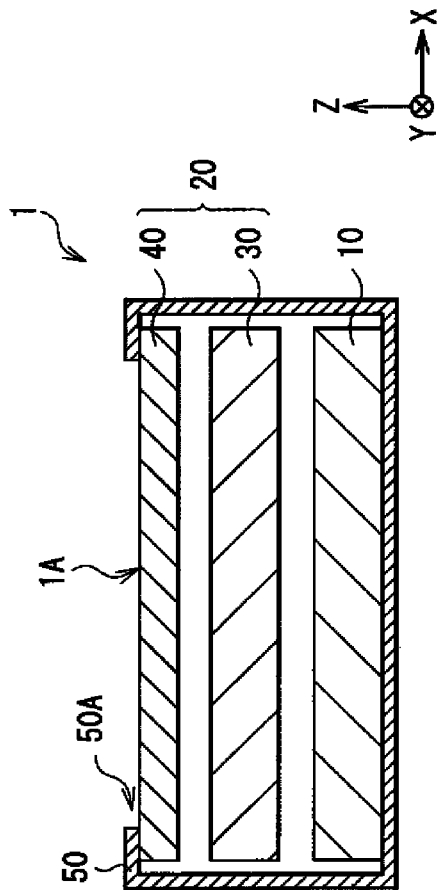
FIGS. 1A and 1B are diagrams respectively showing one example of the sectional configuration and the planar configuration of a display device according to one embodiment of the present disclosure.
Figure 1B:
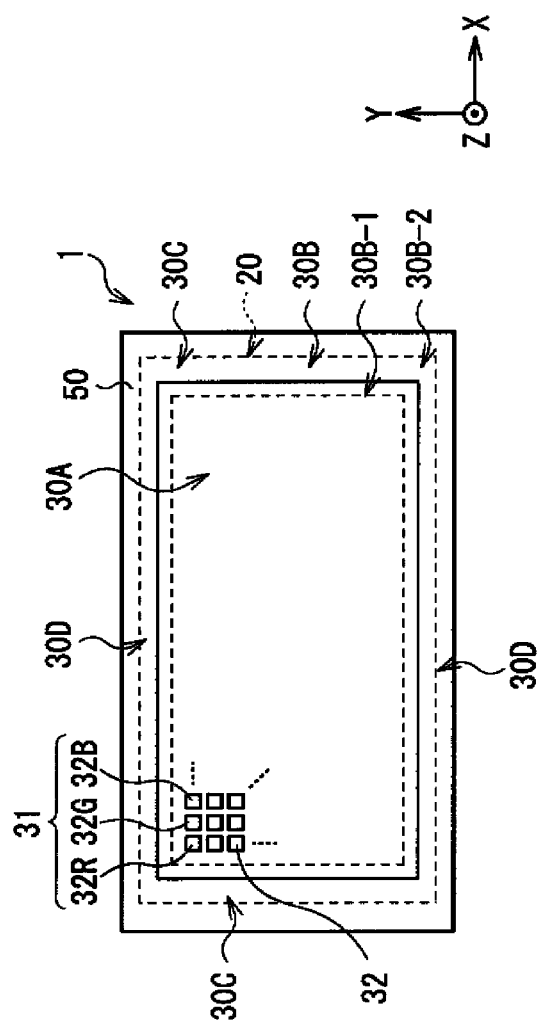

A mode for carrying out techniques of the present disclosure will be described in detail below with reference to the drawings. The order of the description is as follows.
1. Embodiment (FIGS. 1 to 7)
    example in which stripe barrier is provided over panel section
    example in which barrier section is formed on both sides of frame area 2. Modification Examples (FIGS. 8 to 14)
    example in which oblique barrier or step barrier is provided over panel section
    example in which barrier section is formed also on upper and lower sides of frame area
3. Application Example (FIG. 15)
    example in which the above-described display device is applied to electronic apparatus 1. Embodiment Configuration FIG. 1A shows one example of the sectional configuration of a display device 1 according to one embodiment of the present disclosure. FIG. 1B shows one example of the upper surface configuration of the display device 1 of FIG. 1. FIGS. 1A and 1B are schematic diagrams and the dimensions and shapes in these diagrams are not necessarily the same as the actual dimensions and shapes. The display device 1 includes a display panel 20 and a backlight 10 disposed on the back side of the display panel 20. This display device 1 further includes a chassis 50 that houses the display panel 20 and the backlight 10, and a drive section (not shown) that drives the display panel 20 (specifically, a panel section 30 to be described later).

The backlight 10 is a surface emission source that illuminates the display panel 20 from the back side. The chassis 50 has an aperture 50A at the part opposed to the upper surface of the display panel 20 as a video display surface 1A. The edge of the aperture 50A is disposed in the area opposed to a frame area 30B to be described later. The display panel 20 has the panel section 30 and a barrier section 40. The upper surface of the display panel 20 serves as the video display surface 1A and the barrier section 40 is disposed at the surface on the side of the video display surface 1A.

The panel section 30 is a transmissive panel in which the respective display pixels 31 (see FIG. 1B to be described later) are driven in accordance with a video signal input from the external. The panel section 30 is e.g. a liquid crystal panel, an organic electro-luminescence (EL) panel, or a plasma panel. The panel section 30 has e.g. a rectangular shape having four sides as shown in FIG. 1B. The following various descriptions are based on the assumption that two sides opposed to each other among four sides of the panel section 30 are oriented in the horizontal direction and the remaining two sides are oriented in the vertical direction.

The panel section 30 has a display area 30A in which the plural display pixels 31 are two-dimensionally disposed, and the ring-like frame area 30B at the periphery of the display area 30A. The display area 30A has e.g. a rectangular shape having four sides similarly to the panel section 30 as shown in FIG. 1B. Hereinafter, the partial places of the frame area 30B opposed to each other in the horizontal direction (left-right direction of FIG. 1B) with the intermediary of the display area 30A will be referred to as the partial area 30C. Furthermore, the partial places of the frame area 30B opposed to each other in the vertical direction (upward-downward direction of FIG. 1B) with the intermediary of the display area 30A will be referred to as the partial area 30D.

Figure 4:
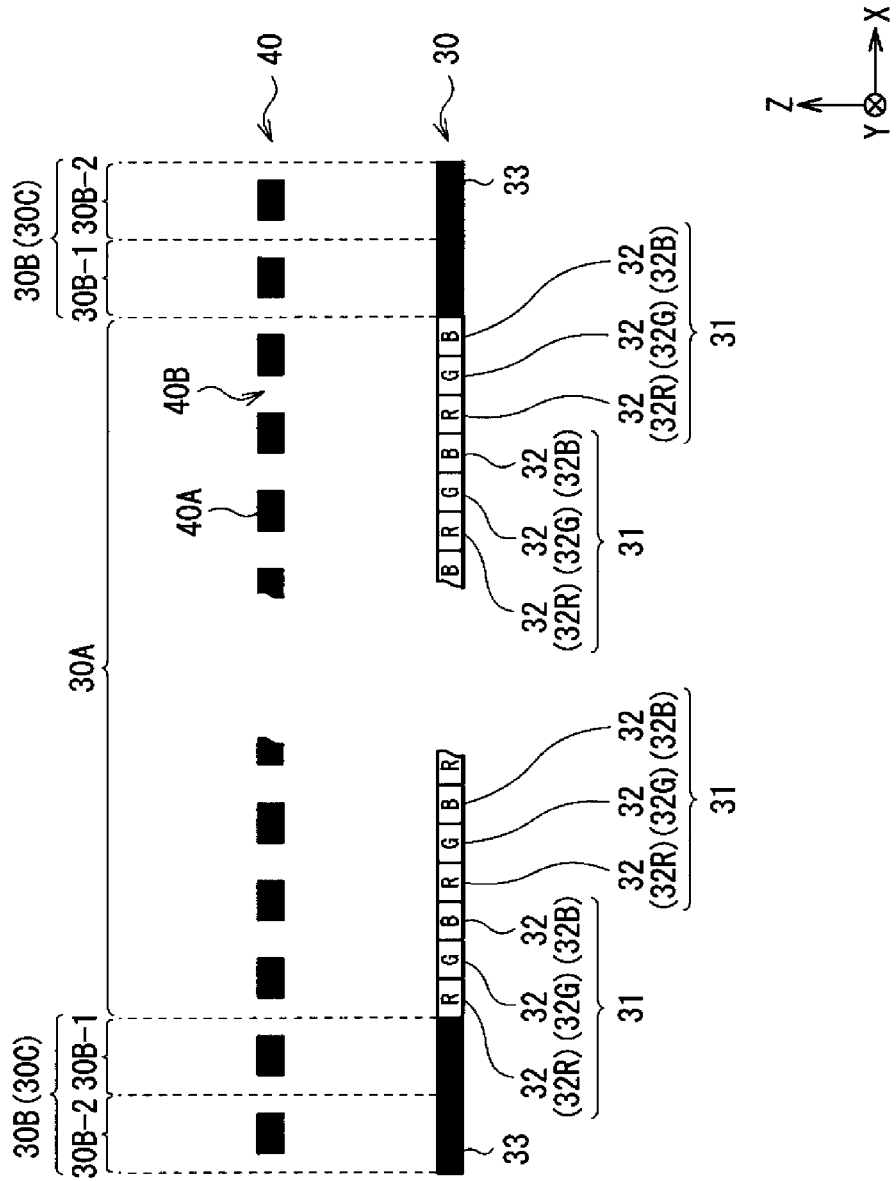
FIG. 4 is a sectional view showing one example of the internal configuration of the barrier section together with the panel section.

The frame area 30B can be divided into two areas based on the relationship with the aperture 50A of the chassis 50. For example, as shown in FIG. 1B, the frame area 30B is composed of a ring-like frame exposed area 30B-1 exposed in the aperture 50A and a ring-like frame covered area 30B-2 covered by the chassis 50. The frame exposed area 30B-1 is disposed on the side of the display area 30A and the frame covered area 30B-2 is disposed at the periphery of the frame exposed area 30B-1. The frame area 30B is covered by a black matrix 33 having light blocking capability as shown in FIG. 4 to be described later. The black matrix 33 is disposed also among the display pixels 31 for example although not shown in the diagram.

Each display pixel 31 provided in the display area 30A is composed of plural sub-pixels 32. For example, as shown in FIG. 1B, the display pixel 31 is composed of a sub-pixel 32R for red, a sub-pixel 32G for green, and a sub-pixel 32B for blue. The sub-pixels 32R of the respective display pixels 31 are disposed on one row along the vertical direction (upward-downward direction of FIG. 1B) for example. Similarly, the sub-pixels 32G of the respective display pixels 31 are also disposed on one row along the vertical direction (upward-downward direction of FIG. 1B) for example, and the sub-pixels 32B of the respective display pixels 31 are also disposed on one row along the vertical direction (upward-downward direction of FIG. 1B) for example. That is, the sub-pixels 32R, 32G, and 32B are based on a so-called stripe array. The kinds and number of colors of the sub-pixels 32 included in the display pixel 31 are not limited to the above description. The array of the sub-pixels 32R, 32G, and 32B is also not limited to the above description.

The barrier section 40 blocks part of light (image light) output from the respective display pixels 31 of the panel section 30. The barrier section 40 is to allow the viewer to visually recognize two-dimensional video (planar video) that differs for each point of view or visually recognize three-dimensional video (stereoscopic video) from a specific point of view by blocking part of the image light. If the barrier section 40 is so configured that the viewer can visually recognize two-dimensional video (planar video) that differs for each point of view, the display device 1 serves as a so-called multi-view display device. If the barrier section 40 is so configured as to allow visual recognition of three-dimensional video (stereoscopic video) from a specific point of view, the display device 1 serves as a three-dimensional video display device.

Figure 2:
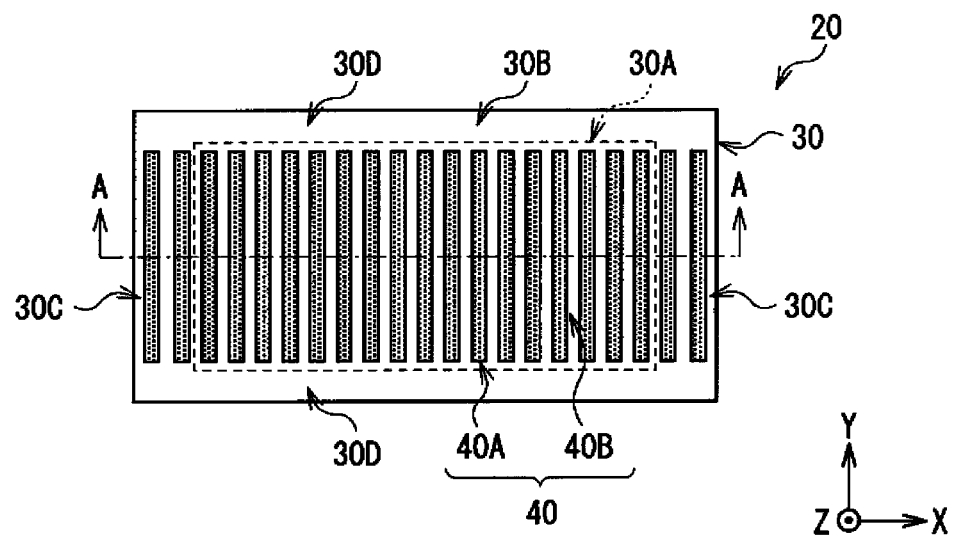
FIG. 2 is a diagram showing one example of the planar configuration of a barrier section in FIG. 1 together with a panel section.

For example, as shown in FIG. 2, the barrier section 40 is disposed at a position opposed to the panel section 30 and has a barrier pattern composed of light blocking slits 40A and light transmissive slits 40B. The light blocking slit 40A is equivalent to one specific example of the light blocking area set forth in the scope of claims. The light transmissive slit 40B is equivalent to one specific example of the light transmissive area set forth in the scope of claims.

Each light blocking slit 40A is formed of e.g. a light blocking component. The plural light blocking slits 40A are disposed regularly as a whole. The respective light blocking slits 40A have the same shape and the same size as shown in FIG. 2 for example. Each light transmissive slit 40B is e.g. an aperture. The plural light transmissive slits 40B are disposed regularly as a whole. The respective light transmissive slits 40B have the same shape and the same size as shown in FIG. 2 for example.

For example, as shown in FIG. 2, the plural light blocking slits 40A are extended along the upward-downward direction (vertical direction) of FIG. 2 and disposed on one row along the left-right direction (horizontal direction) of FIG. 2. Similarly, the light transmissive slits 40B are extended along the upward-downward direction (vertical direction) of FIG. 2 and disposed on one row along the left-right direction (horizontal direction) of FIG. 2 as shown in FIG. 2 for example. Each light blocking slit 40A is so disposed as not to straddle both the display area 30A and the frame area 30B. That is, some light blocking slits 40A are disposed in only the display area 30A, and the other light blocking slits 40A are disposed in only the frame area 30B. In contrast, some light transmissive slits 40B are so disposed as not to straddle both the display area 30A and the frame area 30B, and the other light transmissive slits 40B are so disposed as to straddle both the display area 30A and the frame area 30B. The light blocking slits 40A and the light transmissive slits 40B are alternately disposed in the arrangement direction as shown in FIG. 2 for example.

Figure 3:
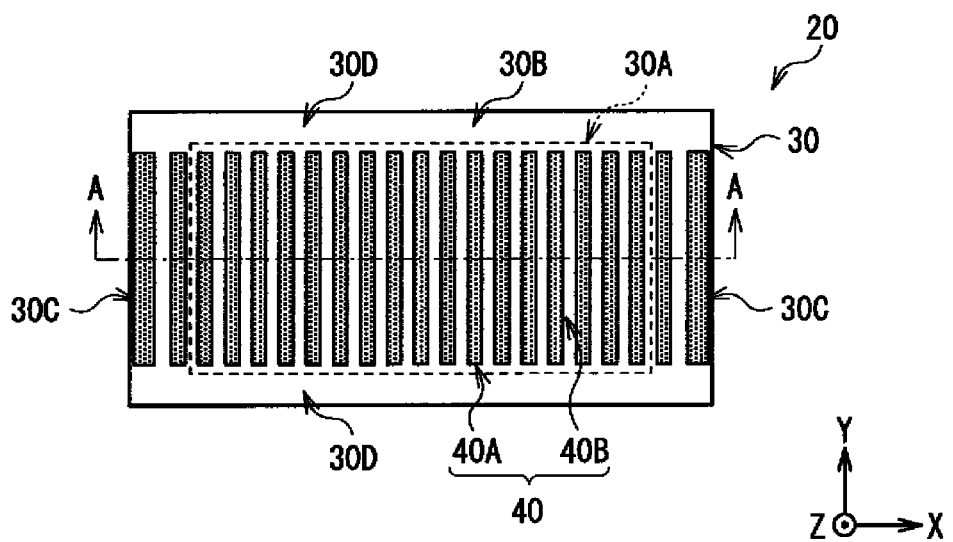
FIG. 3 is a diagram showing another example of the planar configuration of the barrier section in FIG. 1 together with the panel section.

All light blocking slits 40A do not need to have the same shape and the same size. For example, as shown in FIG. 3, only one or plural light blocking slits 40A at both ends of the arrangement direction among the plural light blocking slits 40A may have a width wider than that of the other light blocking slits 40A. That is, the respective light blocking slits 40A may have various shapes and sizes within such a range that the respective light transmissive slits 40B have the same shape and the same size.

FIG. 4 schematically shows one example of the sectional configuration along the direction of arrow A-A in FIG. 2. The light blocking slits 40A and the light transmissive slits 40B are disposed in the area opposed to the display area 30A and the ring-like area opposed to the frame area 30B as shown in FIGS. 2 to 4. That is, the light blocking slits 40A and the light transmissive slits 40B are disposed in not only the area opposed to the display area 30A but also the ring-like area opposed to the frame area 30B.

The light blocking slits 40A and the light transmissive slits 40B are disposed in the area opposed to the display area 30A and at places corresponding to the left and right sides of the display area 30A (i.e. partial areas 30C) in the ring-like area opposed to the frame area 30B. The light blocking slits 40A and the light transmissive slits 40B are formed in both the frame exposed area 30B-1 and the frame covered area 30B-2 as shown in FIG. 4.

Figure 5:
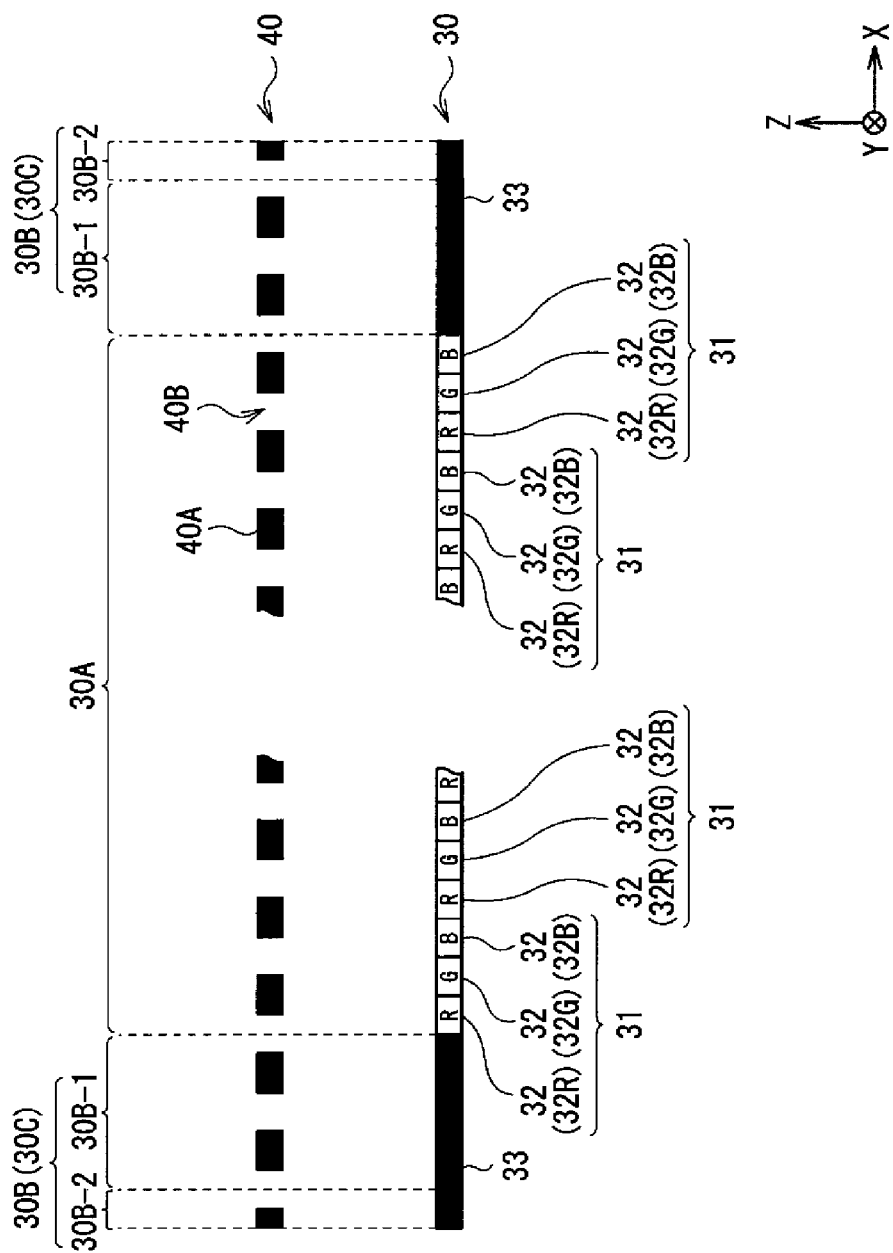
FIG. 5 is a sectional view showing one modification example of the internal configuration of the barrier section together with the panel section.
Figure 6:
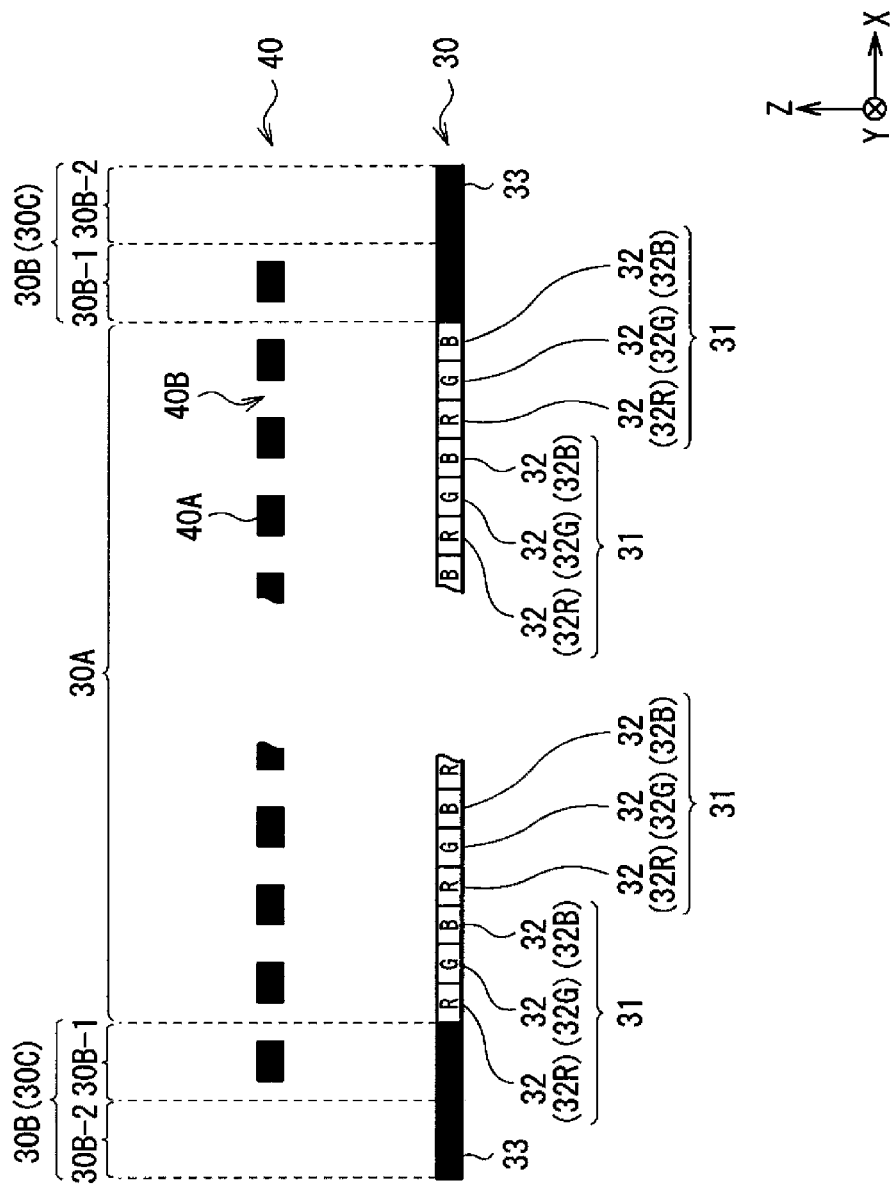
FIG. 6 is a sectional view showing another modification example of the internal configuration of the barrier section together with the panel section.

One light blocking slit 40A is formed in each of the right-side frame exposed area 30B-1 and the left-side frame exposed area 30B-1 as shown in FIG. 4 for example. As shown in FIG. 5, two or more light blocking slits 40A may be formed in each of the right-side frame exposed area 30B-1 and the left-side frame exposed area 30B-1 for example. One light blocking slit 40A is formed in each of the right-side frame covered area 30B-2 and the left-side frame covered area 30B-2 as shown in FIG. 4 for example. As shown in FIG. 6, the light blocking slit 40A may be absent in the right-side and left-side frame covered area 30B-2 for example. Although not shown in the diagram, two or more light blocking slits 40A may be formed in each of the right-side frame covered area 30B-2 and the left-side frame covered area 30B-2 for example.

Figure 7:
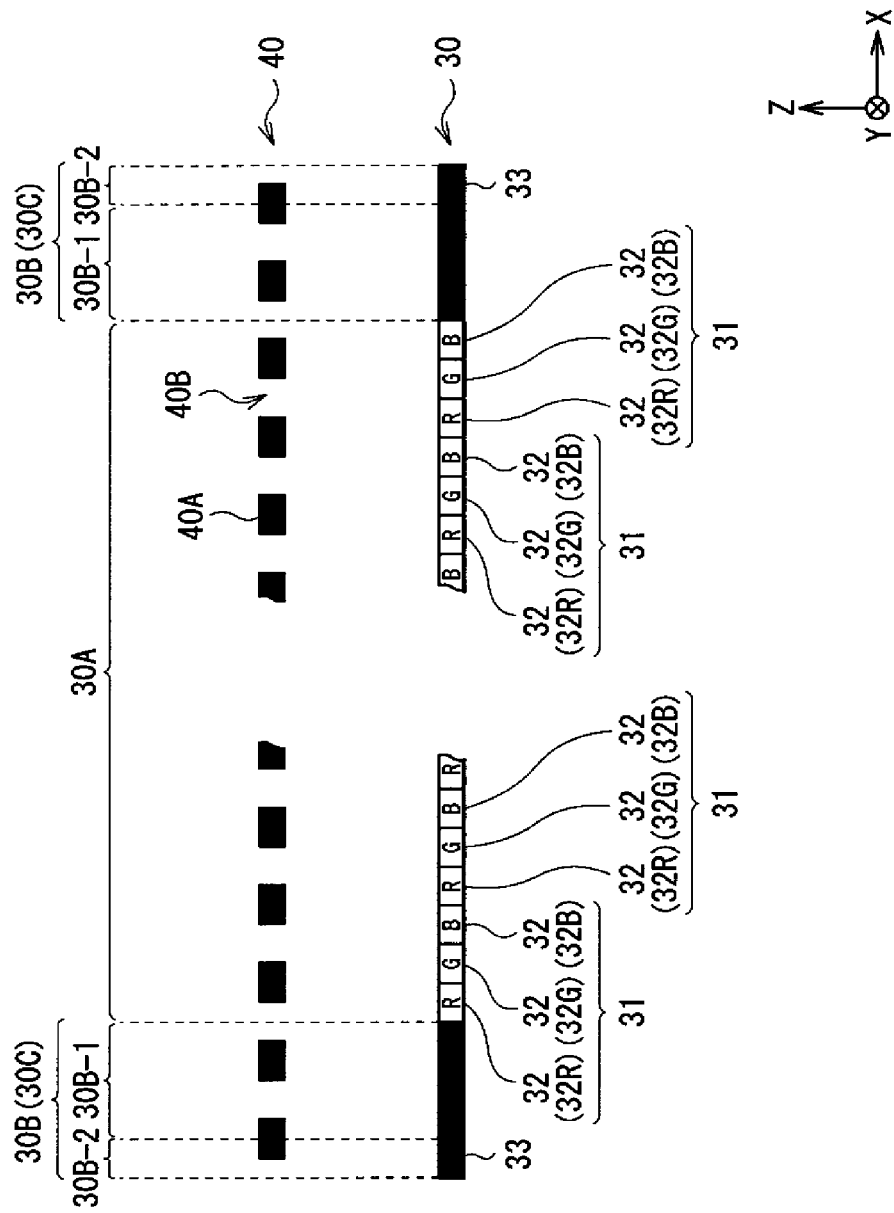
FIG. 7 is a sectional view showing further another modification example of the internal configuration of the barrier section together with the panel section.

The light transmissive slit 40B is so formed as to straddle the display area 30A and the frame exposed area 30B-1 as shown in FIG. 4 for example. Furthermore, the light transmissive slit 40B is so formed as to straddle the frame exposed area 30B-1 and the frame covered area 30B-2 as shown in FIG. 4 for example. As shown in FIG. 7, the light blocking slit 40A may be so formed as to straddle the frame exposed area 30B-1 and the frame covered area 30B-2 for example. In this case, the light transmissive slit 40B may be formed in the frame exposed area 30B-1 so as not to straddle the frame exposed area 30B-1 and the frame covered area 30B-2.

Operation

In the present embodiment, light output from the backlight 10 is modulated by the respective display pixels 31 of the panel section 30 and predetermined image light is output to the barrier section 40. Then, part of the image light is blocked by the light blocking slits 40A of the barrier section 40 and light transmitted through the light transmissive slits 40B is output from the video display surface 1A of the display panel 20. The light output from the video display surface 1A forms images at plural points of view for example, so that two-dimensional video (planar video) is generated. Alternatively, the light output from the video display surface 1A forms an image at a specific point of view for example, so that three-dimensional video (stereoscopic video) is generated.

Effects

In the present embodiment, both the light blocking slit 40A and the light transmissive slit 40B of the barrier section 40 are disposed in not only the area opposed to the display area 30A but also the ring-like area opposed to the frame area 30B. Due to this feature, in not only the display area 30A but also the frame area 30B, the light blocking slit 40A included in the barrier pattern is disposed and the light transmissive slit 40B included in the barrier pattern is disposed. As a result, light that is unnecessary for displaying is blocked by the light blocking slit 40A included in the barrier pattern in not only the display area 30A but also the frame area 30B. Furthermore, light transmitted through the light transmissive slit 40B included in the barrier pattern is output from not only the display area 30A but also the frame area 30B. Therefore, the black streak can be made inconspicuous with prevention of light leakage that leads to displaying failure.

2. Modification Examples

First Modification Example

In the above-described embodiment, each light blocking slit 40A is formed of e.g. a light blocking component and each light transmissive slit 40B is e.g. an aperture. That is, the barrier section 40 is based on a static configuration. However, the barrier section 40 may be based on a dynamic configuration in which the optical characteristics of the light blocking slit 40A can be controlled based on a control signal from the external.

The barrier section 40 has e.g. a pair of transparent electrode substrates formed of glass or the like including a transparent electrode, and a pair of polarizing plates provided outside the pair of transparent electrode substrates. The pair of transparent electrode substrates have alignment films for which alignment treatment is performed in a predetermined direction on their surfaces opposed to each other. The barrier section 40 has a liquid crystal layer between the pair of transparent electrode substrates. The barrier section 40 has the transparent electrode at the place corresponding to the light blocking slit 40A and has a transparent electrode that can be driven independently of the former transparent electrode also at the place corresponding to the light transmissive slit 40B. In this manner, in the present modification example, the barrier section 40 is based on a dynamic configuration and therefore the drive section drives not only the panel section 30 but also the barrier section 40.

Except for that the barrier section 40 is based on a dynamic configuration, the present modification example has the same configuration as that of the above-described embodiment regarding the remaining part. Therefore, as with the above-described embodiment, the black streak can be made inconspicuous with prevention of light leakage that leads to displaying failure.

Second Modification Example

Figure 8:
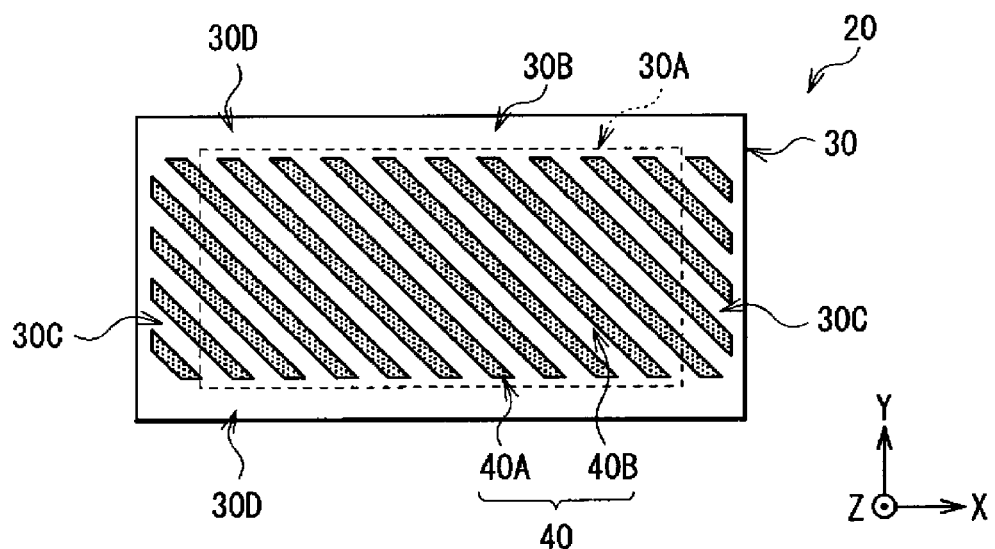
FIG. 8 is a diagram showing one modification example of the planar configuration of the barrier section in FIG. 1.

In the above-described embodiment, the barrier pattern is extended along the vertical direction. However, it may be extended along an oblique direction for example. For example, as shown in FIG. 8, the light blocking slit 40A and the light transmissive slit 40B may be extended along a direction intersecting the vertical direction (i.e. oblique direction). FIG. 8 shows one example of the planar configuration of the barrier section 40 according to the present modification example together with the panel section 30.

In the present modification example, part of the light blocking slits 40A is so disposed as to straddle both the display area 30A and the frame area 30B. Similarly, part of the light transmissive slits 40B is also so disposed as to straddle both the display area 30A and the frame area 30B.

Also in the present modification example, as with the above-described embodiment, light that is unnecessary for displaying is blocked by the light blocking slit 40A included in the barrier pattern in not only the display area 30A but also the frame area 30B. Furthermore, light transmitted through the light transmissive slit 40B included in the barrier pattern is output from not only the display area 30A but also the frame area 30B. Therefore, the black streak can be made inconspicuous with prevention of light leakage that leads to displaying failure.

Third Modification Example

Figure 9:
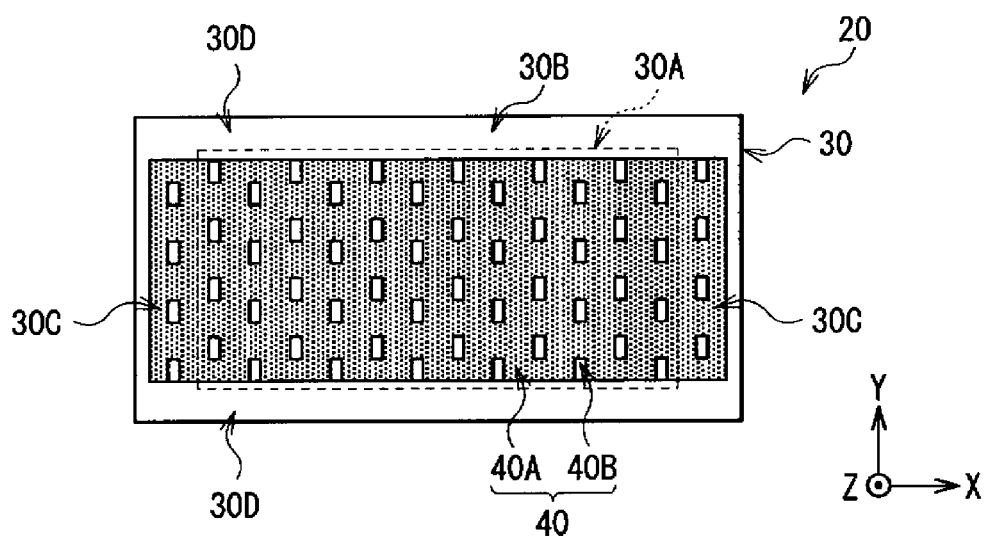
FIG. 9 is a diagram showing another modification example of the planar configuration of the barrier section in FIG. 1.

In the above-described embodiment, the barrier pattern is extended along the vertical direction or an oblique direction. However, e.g. a step barrier pattern may be employed. The step barrier pattern refers to e.g. a pattern in which, as shown in FIG. 9, the plural light transmissive slits 40B are arranged along a direction intersecting one side of the display area 30A (or the panel section 30) and arranged also along a direction intersecting this arrangement direction. FIG. 9 shows one example of the planar configuration of the barrier section 40 according to the present modification example together with the panel section 30.

Also in the present modification example, as with the above-described embodiment, light that is unnecessary for displaying is blocked by the light blocking slit 40A included in the barrier pattern in not only the display area 30A but also the frame area 30B. Furthermore, light transmitted through the light transmissive slit 40B included in the barrier pattern is output from not only the display area 30A but also the frame area 30B. Therefore, the black streak can be made inconspicuous with prevention of light leakage that leads to displaying failure.

Fourth Modification Example

Figure 10:
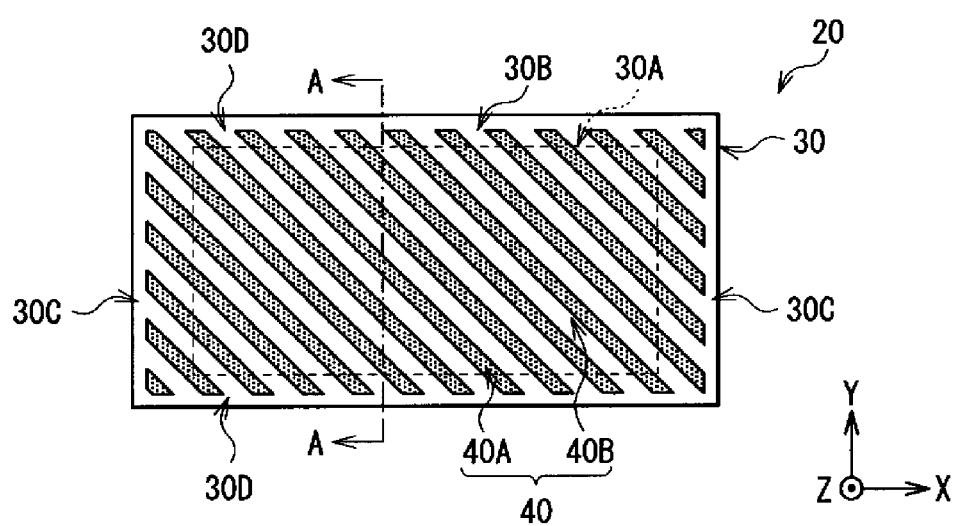
FIG. 10 is a diagram showing one modification example of the planar configuration of the barrier section in FIG. 8.
Figure 11:
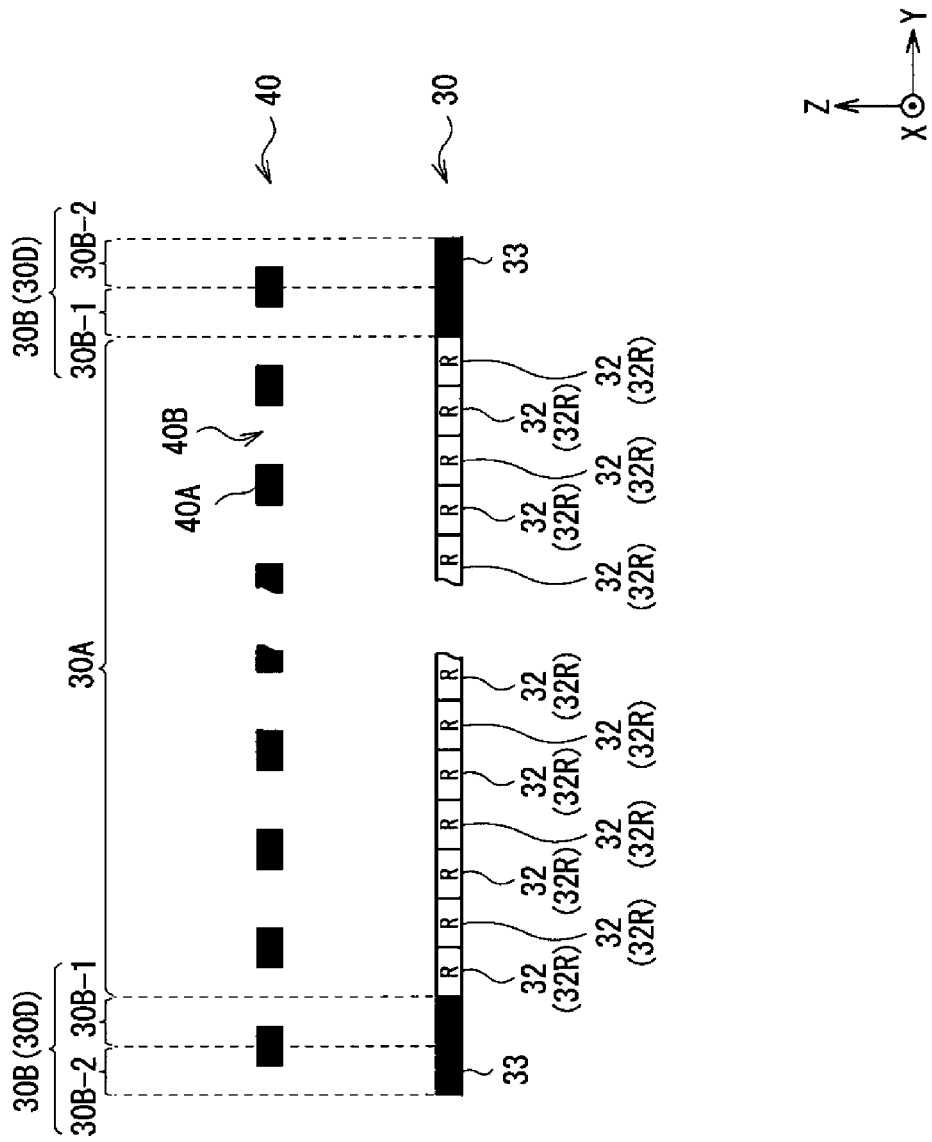
FIG. 11 is a diagram showing one example of the sectional configuration along the direction of arrow A-A in FIG. 10.

In the above-described second modification example and third modification example, the light blocking slit 40A and the light transmissive slit 40B may be disposed in not only the display area 30A and the partial area 30C but also the partial area 30D as shown in FIGS. 10 to 13 for example. FIG. 10 shows one modification example of the planar configuration of the barrier section 40 according to the above-described second modification example. FIG. 11 shows one example of the sectional configuration along the direction of arrow A-A in FIG. 10.

Figure 12:
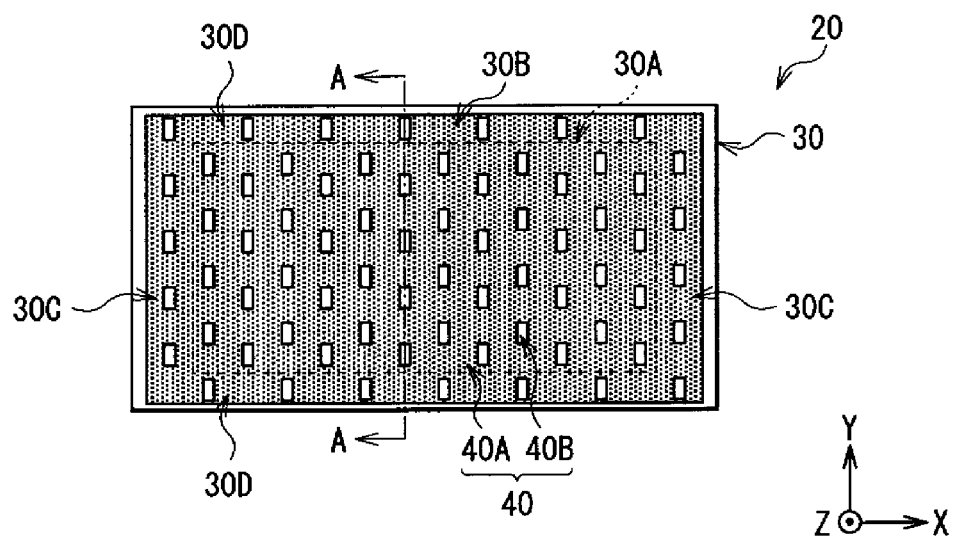
FIG. 12 is a diagram showing one modification example of the planar configuration of the barrier section in FIG. 9.
Figure 13:
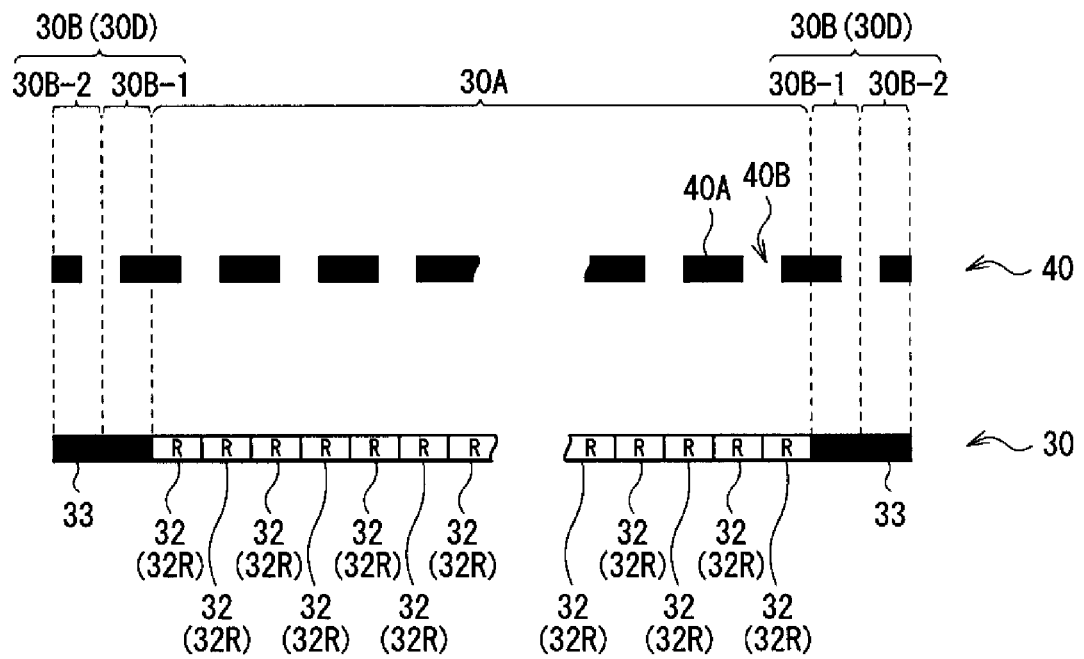
FIG. 13 is a diagram showing one example of the sectional configuration along the direction of arrow A-A in FIG. 12.

FIG. 12 shows one modification example of the planar configuration of the barrier section 40 according to the above-described third modification example. FIG. 13 shows one example of the sectional configuration along the direction of arrow A-A in FIG. 12.

Like in the present modification example, the light blocking slit 40A and the light transmissive slit 40B may be disposed in the display area 30A and the partial areas 30C and 30D. In this case, for example also when the panel section 30 is so used as to be rotated by 90 degrees, the black streak can be made inconspicuous with prevention of light leakage that leads to displaying failure.

Fifth Modification Example

Figure 14:
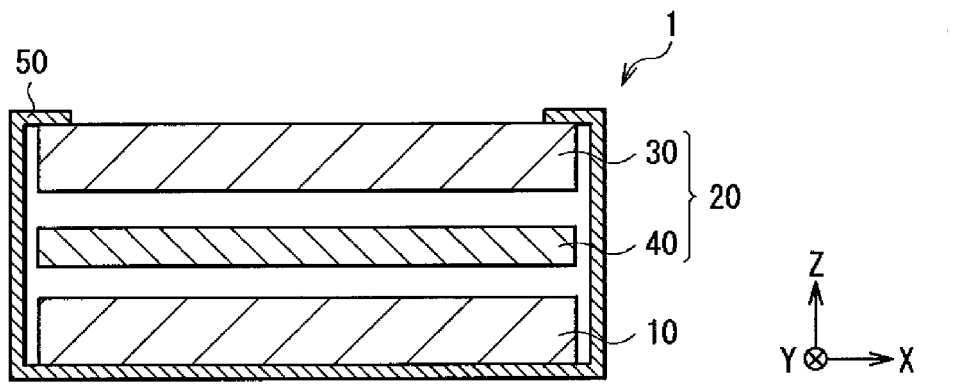
FIG. 14 is a diagram showing another example of the sectional configuration of the display device of FIG. 1.

In the above-described embodiment and first to fourth modification examples, the barrier section 40 may be disposed under the panel section 30 (i.e. between the panel section 30 and the backlight 10) as shown in FIG. 14 for example. Also in this case, the black streak can be made inconspicuous with prevention of light leakage that leads to displaying failure.

3. Application Example

Figure 15:
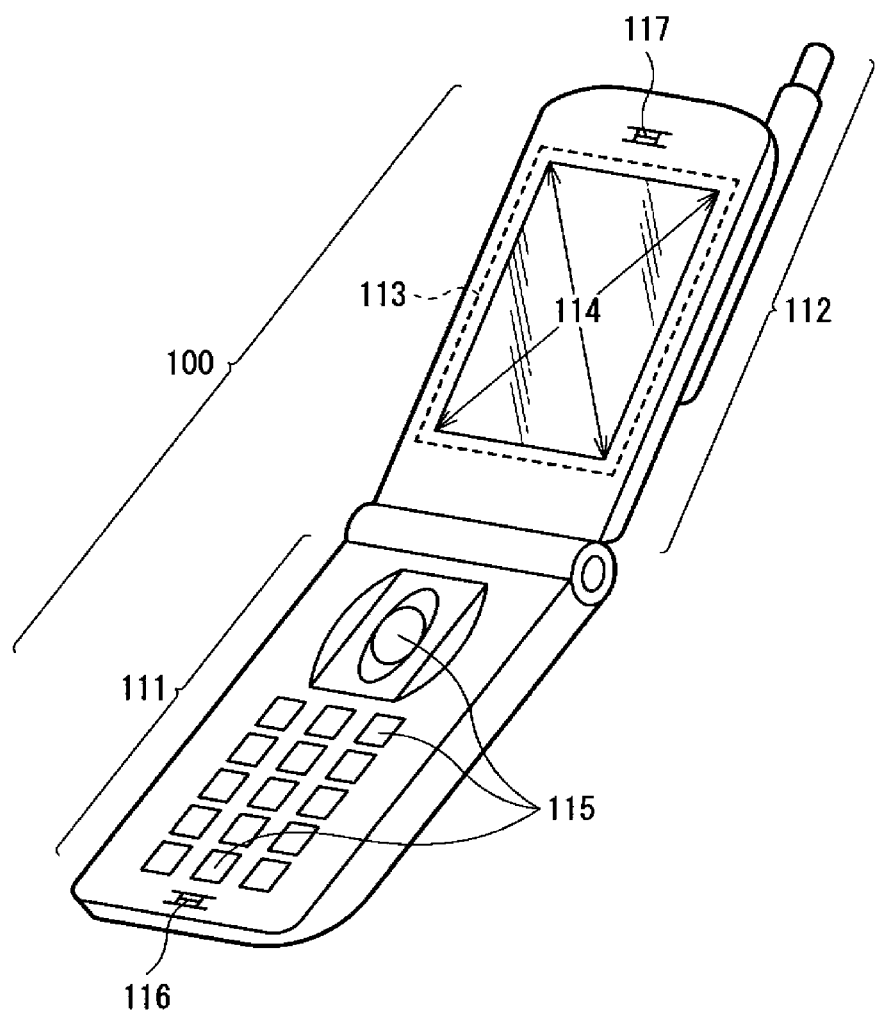
FIG. 15 is a perspective view showing one example of electronic apparatus according to one application example.

One application example of the display device 1 according to the above-described embodiment and modification examples thereof will be described below. FIG. 15 is a perspective view showing one example of the schematic configuration of electronic apparatus 100 according to the present application example. The electronic apparatus 100 is a cellular phone and includes e.g. a main body section 111 and a display body section 112 provided for the main body section 111 openably and closably as shown in FIG. 15. The main body section 111 has operation buttons 115 and a mouthpiece 116. The display body section 112 has a display device 113 and a receiver 117. The display device 113 displays various kinds of information relating to telephone communication on a display screen 114 of the display device 113. The electronic apparatus 100 includes a control section (not shown) for controlling the operation of the display device 113. This control section is provided inside the main body section 111 or the display body section 112 as part of a control section responsible for control of the whole electronic apparatus 100 or separately from this control section.

The display device 113 has the same configuration as that of the display device 1 according to the above-described embodiment and modification examples thereof. Thus, in the display device 113, the black streak can be made inconspicuous with prevention of light leakage that leads to displaying failure.

Examples of the electronic apparatus to which the display device 1 according to the above-described embodiment and modification examples thereof can be applied include, besides the above-described cellular phone, personal computer, liquid crystal television, video tape recorder of a view finder type or monitor direct viewing type, car navigation device, pager, electronic notebook, calculator, word processor, work station, video phone, and POS terminal.

It should be understood by those skilled in the art that various modifications, combinations, sub-combinations and alterations may occur depending on design requirements and other factors insofar as they are within the scope of the appended claims or the equivalents thereof.

What is claimed is:
1. A display panel comprising:
a panel section configured to have a display area in which a plurality of display pixels are two-dimensionally disposed, and a ring-like frame area provided at periphery of the display area; and
a barrier section configured to be disposed at a position opposed to the panel section and have a barrier pattern composed of a light blocking area and a light transmissive area,
wherein,
both the light blocking area and the light transmissive area are disposed in a first area opposed to the display area and a ring-like second area opposed to the frame area,
the display area has a rectangular shape having four sides,
the light blocking area is formed of a plurality of light blocking slits extended along an oblique direction to the four sides of the display area,
the second area includes a frame covered area and a frame exposed area, the frame covered area being covered by a chassis that houses the display panel and has an aperture, the frame exposed area being exposed in the aperture, and
an arrangement pattern of the light blocking area and the light transmissive area in the frame covered area is different from that in the frame exposed area.

2. A display device comprising:
a panel section configured to have a display area in which a plurality of display pixels are two-dimensionally disposed, and a ring-like frame area provided at periphery of the display area; and
a barrier section configured to be disposed at a position opposed to the panel section and have a barrier pattern composed of a light blocking area and a light transmissive area,
wherein,
both the light blocking area and the light transmissive area are disposed in a first area opposed to the display area and a ring-like second area opposed to the frame area,
the display area has a rectangular shape having four sides,
the light blocking area is formed of a plurality of light blocking slits extended along an oblique direction to the four sides of the display area,
the second area includes a frame covered area and a frame exposed area, the frame covered area being covered by a chassis that houses the display panel and has an aperture, the frame exposed area being exposed in the aperture, and
an arrangement pattern of the light blocking area and the light transmissive area in the frame covered area is different from that in the frame exposed area.

3. An electronic apparatus including a display device, the display device comprising:
a panel section configured to have a display area in which a plurality of display pixels are two-dimensionally disposed, and a ring-like frame area provided at periphery of the display area; and
a barrier section configured to be disposed at a position opposed to the panel section and have a barrier pattern composed of a light blocking area and a light transmissive area
wherein,
both the light blocking area and the light transmissive area are disposed in a first area opposed to the display area and a ring-like second area opposed to the frame area,
the display area has a rectangular shape having four sides,
the light blocking area is formed of a plurality of light blocking slits extended along an oblique direction to the four sides of the display area,
the second area includes a frame covered area and a frame exposed area, the frame covered area being covered by a chassis that houses the display panel and has an aperture, the frame exposed area being exposed in the aperture, and an arrangement pattern of the light blocking area and the light transmissive area in the frame covered area is different from that in the frame exposed area.

4. A display panel, comprising:

a panel section configured to have a display area in which a plurality of display pixels are two-dimensionally disposed, and a ring-like frame area provided at periphery of the display area; and;

a barrier section configured to be disposed at a position opposed to the panel section and have a barrier pattern composed of a light blocking area and a light transmissive area, wherein, both the light blocking area and the light transmissive area are disposed in a first area opposed to the display area and a ring-like second area opposed to the frame area, the light transmissive area is formed of a plurality of light transmissive slits, the plurality of light transmissive slits is formed in a staggered arrangement, the second area includes a frame covered area and a frame exposed area, the frame covered area being covered by a chassis that houses the display panel and has an aperture, the frame exposed area being exposed in the aperture, and an arrangement pattern of the light blocking area and the light transmissive area in the frame covered area is different from that in the frame exposed area.

5. A display device comprising:

a panel section configured to have a display area in which a plurality of display pixels are two-dimensionally disposed, and a ring-like frame area provided at periphery of the display area; and a barrier section configured to be disposed at a position opposed to the panel section and have a barrier pattern composed of a light blocking area and a light transmissive area, wherein, both the light blocking area and the light transmissive area are disposed in a first area opposed to the display area and a ring-like second area opposed to the frame area, the light transmissive area is formed of a plurality of light transmissive slits, the plurality of light transmissive slits is formed in a staggered arrangement, the second area includes a frame covered area and a frame exposed area, the frame covered area being covered by a chassis that houses the display panel and has an aperture, the frame exposed area being exposed in the aperture, and an arrangement pattern of the light blocking area and the light transmissive area in the frame covered area is different from that in the frame exposed area.

6. An electronic apparatus including a display device, the display device comprising:

a panel section configured to have a display area in which a plurality of display pixels are two-dimensionally disposed, and a ring-like frame area provided at periphery of the display area; and a barrier section configured to be disposed at a position opposed to the panel section and have a barrier pattern composed of a light blocking area and a light transmissive area, wherein, both the light blocking area and the light transmissive area are disposed in a first area opposed to the display area and a ring-like second area opposed to the frame area, the light transmissive area is formed of a plurality of light transmissive slits, the plurality of light transmissive slits is formed in a staggered arrangement, the second area includes a frame covered area and a frame exposed area, the frame covered area being covered by a chassis that houses the display panel and has an aperture, the frame exposed area being exposed in the aperture, and an arrangement pattern of the light blocking area and the light transmissive area in the frame covered area is different from that in the frame exposed area.

7. The display panel according to claim 1, wherein the light transmissive area is formed of a plurality of light transmissive slits.

8. The display panel according to claim 4, wherein:

the display area has a rectangular shape having four sides, and the light blocking area is formed of a plurality of light blocking slits extended along a direction parallel to one side of the display area.

9. The display panel according to claim 7, wherein the plurality of light transmissive slits are disposed at regular intervals.

10. The display panel according to claim 9, wherein the light transmissive slits have the same shape and the same size.

11. The display panel according to claim 9, wherein the light transmissive area is disposed at places extended along a first side of the display area in the second area.

12. The display panel according to claim 9, wherein all of the plurality of light transmissive slits is so disposed as to straddle both the first area and the second area.

13. The display panel according to claim 9, wherein part of the plurality of light transmissive slits is so disposed as to straddle both the first area and the second area.

14. The display panel according to claim 9, wherein:

the display area has a rectangular shape having four sides, and the light blocking area is formed of a plurality of light blocking slits extended along a direction intersecting one side of the display area.

15. The display panel according to claim 9, wherein:

the display area has a rectangular shape having four sides, the light blocking area is formed of a plurality of light blocking slits, and the plurality of light blocking slits are arranged along a first direction intersecting one side of the display area and are arranged also along a second direction intersecting the first direction.

16. The display panel according to claim 9, wherein the barrier section has a light blocking component in the light blocking area and has an aperture in the light transmissive area.

17. The display panel according to claim 9, wherein the barrier section is capable of controlling an optical characteristic of the light blocking area based on a control signal from an external.

18. The display panel according to claim 11, wherein the light transmissive area is disposed also at places extended along a second side intersecting the first side of the display area in the second area.

* * * * *